Patented Feb. 18, 1941

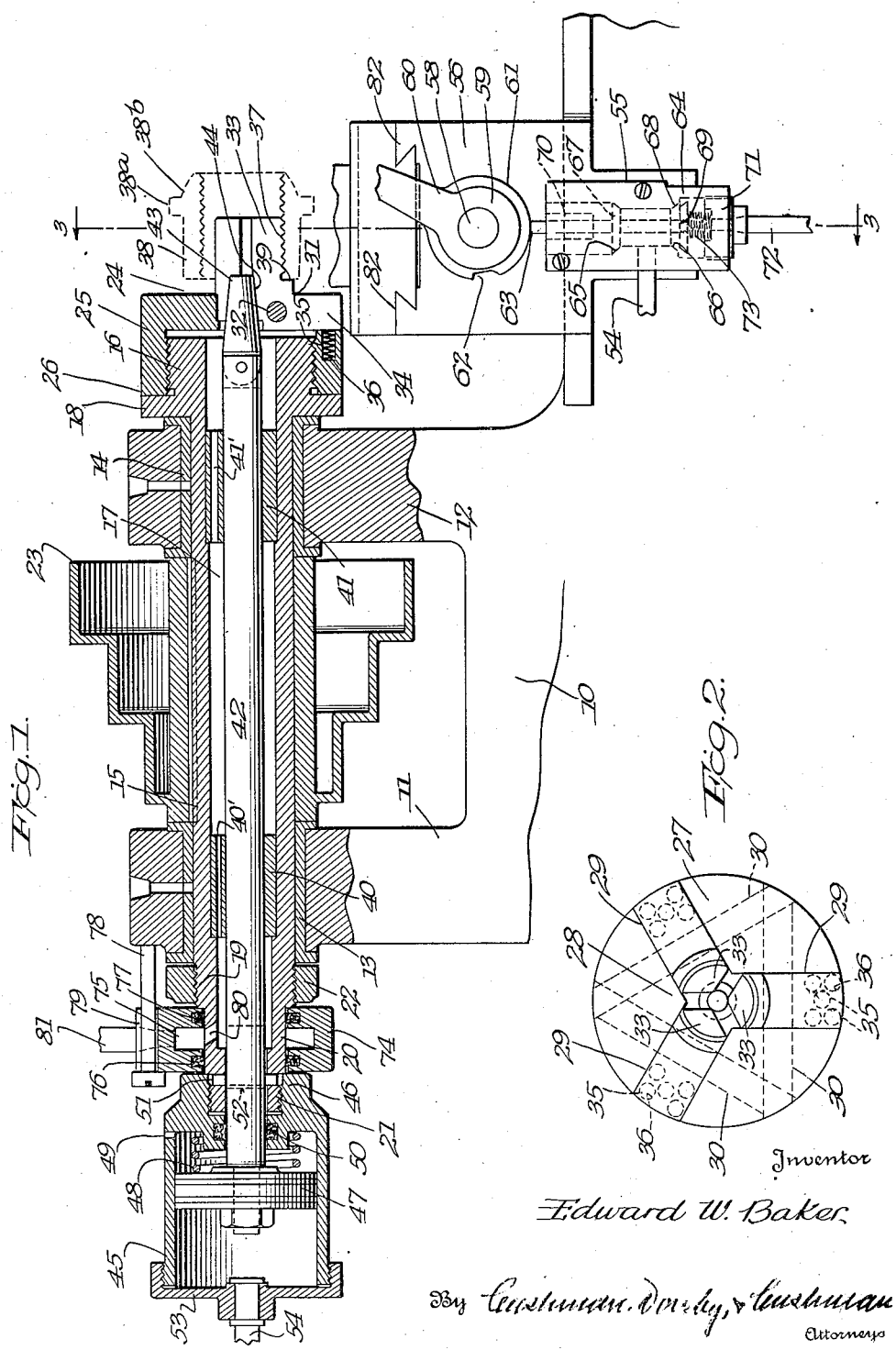

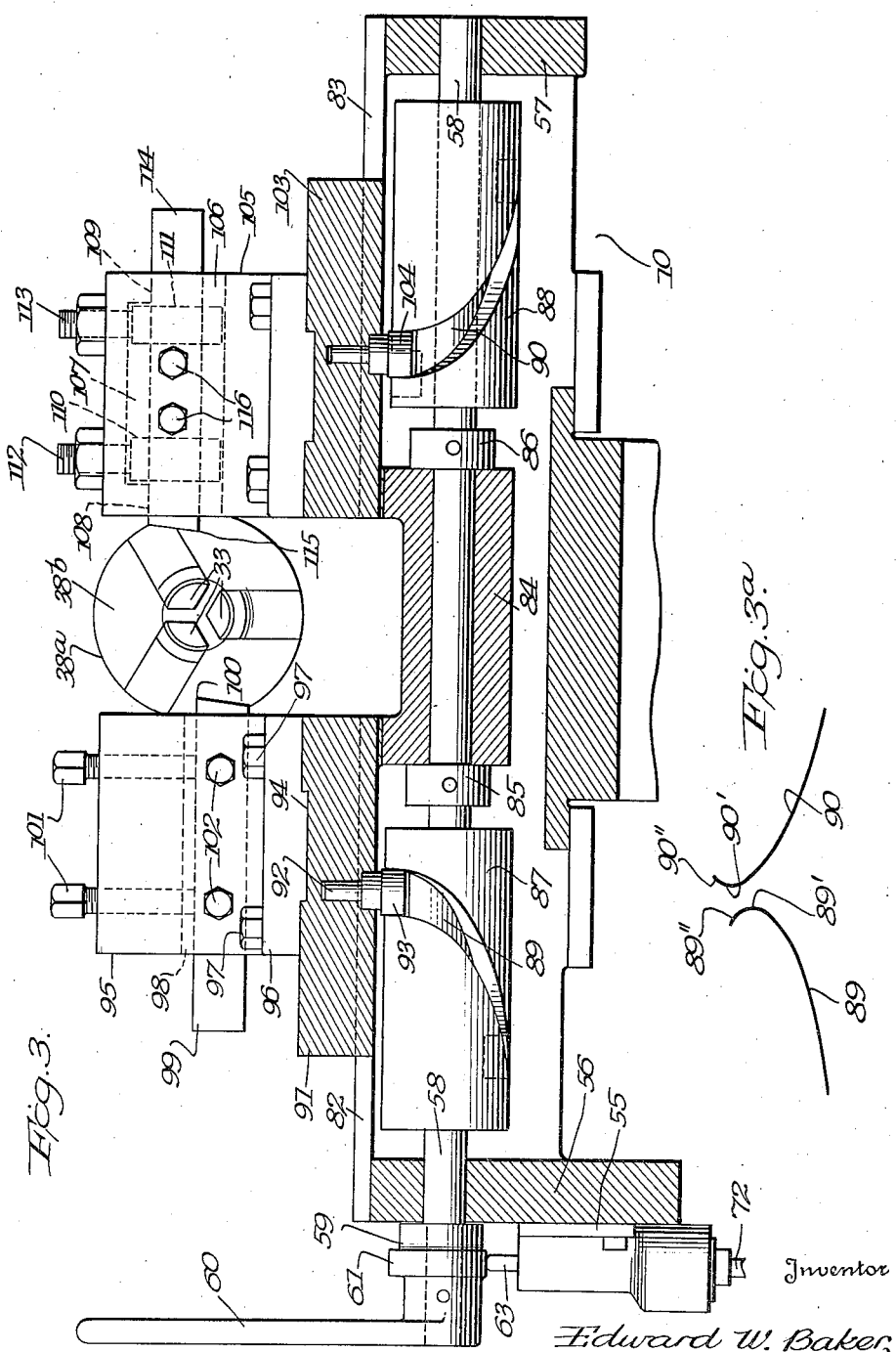

2,232,304

UNITED STATES PATENT OFFICE 2,232,304

MACHINE TOOL

Edward W. Baker, Lexington, Mass., assignor to Jefferson Union Company, Lexington, Mass., a corporation of Massachusetts Application March 30, 1938, Serial No. 199,040

2 Claims. (Cl. 279—2)

The present invention relates to machine tools and has as an object to provide apparatus whereby a predetermined sequence of operations may be automatically enforced.

In the apparatus shown by way of example in the accompanying drawings, means are provided for determining the sequence of operation of a plurality of tools such as a roughing tool and a finishing tool designed to act successively on a workpiece. The illustrated apparatus also includes a collapsible work holder and means for controlling the work holder in correlation with the control of the tools. The invention also includes the work holder per se.

In the drawings,

Figure 1 is an axial section of the apparatus.

Figure 2 is an elevation of the work holder.

Figure 3 is a section substantially on line 3—3 of Figure 1, and

Fig. 3a is a diagrammatic representation of cam grooves which determine the movements of the roughing and finishing tools.

Referring to the drawings, reference numeral 10 designates generally a frame having pedestals 11 and 12 which have bores horizontally aligned and receiving bushings 13 and 14. Journaled in the bushings is a spindle 15 which at one end has a head 16, the spindle having an axial through bore 17. Head 16 comprises an externally threaded extremity backed by a radial flange 18 which is in thrust relation with the adjacent end of bushing 14. At its other end, spindle 15 has a threaded portion 19, a reduced cylindrical portion 20 and a reduced and threaded extremity 21. A nut 22 is threaded on portion 19 and is in thrust relation with the adjacent end of bushing 13. A pulley 23, here shown as being stepped, is fixed on the spindle between pedestals 11 and 12.

A work holder generally designated at 24 comprises a body 25 in the form of a cap with an internally threaded cylindrical flange 26 threaded on the extremity of head 16 and in abutment with flange 18. The cap comprises a cover portion 27 which has an axial opening 28 formed at the intersection of three radial slots 29, the slots being equi-distantly spaced. Furthermore, portion 27 is provided with three bores 30 which intersect the slots 29, respectively, at right angles thereto.

Positioned in each slot 29 is a bell crank member 31 which is pivoted on a pin 32 positioned in the intersecting bore 30, Figure 1. Each member 31 has a generally axially extending arm 33 and a generally radially extending arm 34. Clockwise swinging of the member 31 is limited by abutment of arm 34 against the adjacent edge of flange 26. The abutment edge of flange 26 is provided with one or more bores 35 receiving a compression spring or springs 36 acting on the arm 34 to swing member 31 in a counterclockwise direction.

As will be hereinafter described, means is provided for positively swinging the members 31 about their pivots in a manner to cause the axially extending arms 33 to be moved apart to a limit position determined by abutment of arms 34 with the cooperating edges of flange 26. With arms 33 in their limit positions apart, their external end portions 37 are disposed as segments of a cylinder and are provided with threads for engagement with the internal threads of a workpiece 38. The threaded portions 37 of arms 33 are backed by abutment shoulders 39 which limit the extent of insertion of the threaded portions in the workpiece. The latter is herein assumed to be of generally the form of the workpiece shown in my copending application Serial No. 199,039, filed March 30, 1938.

In the operation of the device, the spindle 15, as seen from its right hand end, is rotated in a counterclockwise direction, and, assuming that arms 33, which constitute a segmental arbor, are at their limit positions apart, the workpiece 38 is moved by the attendant toward the arbor in coaxial relation therewith and the arbor threads itself into the workpiece until the inner edge of the latter abuts the shoulders 39 whereupon the workpiece participates in the rotation of the spindle. When the expanding force is released from arm portions 33, they are moved inwardly due to the action of springs 36, the extent of inward movement being such that the threads of the arbor are entirely released from the threads of the workpiece so that the latter may be removed.

It will be understood from the above that in the preferred embodiment as illustrated, no outward radial pressure is exerted on the workpiece for the purpose of locking it to the arbor. On the contrary, the fully expanded arbor has an easy threading fit with the workpiece so as to thread into the latter as the same is manually held, the workpiece being caused to rotate with the arbor only when further relative axial movement becomes impossible due to the abutment of the workpiece with shoulders 39.

The bore 17 of the spindle 15 has disposed therein a pair of bushings 40 and 41 which slidably receive a rod 42 of circular cross-section. At its right hand end, Figure 1, rod 42 has pivoted to its extremity, through a loose tongue and groove joint, a conical wedge member 43 for cooperation with the generally correspondingly inclined inner edges, as at 44, of the arbor segments. At its other end, rod 42 projects somewhat beyond the extremity of the spindle and into a cylinder 45 which has an internally threaded neck 46 threaded on the spindle extremity 21. The extremity of rod 42 within cylinder 45 has fixed thereon a piston 47 which is urged to the left, Figure 1, by a compression spring 48. The cylinder is provided with a vent 49 at the right hand side of the piston 47, Figure 1, and its end wall, on the same side of the piston, is provided with an annular recess in which is disposed a packing ring 50 to provide a tight joint with rod 42.

The spindle bore 17 closely surrounds the rod 42 at the spindle extremity 21. The extremity 21 may be provided with diametrical bores receiving a pin 51 which is passed through a slot 52 of rod 42. Rod 42 is thus caused to rotate with spindle 15 and with cylinder 45 and the slot 52 is of sufficient length to afford the necessary range of reciprocation for rod 42. The pin 51 and slot 52 may be omitted since rod 42 will tend to rotate with the spindle, and, in any event, it is not essential that the rod and spindle rotate together.

Cylinder 45 has threaded thereon a cover 53 which has an axial bore in which is swiveled the end of a tube 54 which leads from a control valve 55.

Frame 10 provides upright side wall portions 56 and 57, Figures 1 and 3, in which are journaled the ends of a shaft 58 which is horizontally disposed and in a plane perpendicular to the axis of spindle 15. At one end, shaft 58 has fixed thereto a boss 59 from which extends a radial lever 60. Boss 59 has a circular rib 61 which is coaxial with shaft 58 and at one point, the rib has a recess 62 for cooperation with the extremity of the radially disposed stem 63 of valve 55.

Valve 55 comprises a hollow body 64 which presents oppositely faced conical seats 65 and 66 for alternate cooperation with valve members 67 and 68 fixed on stem 63, valve 68 being secured to the lower extremity of the latter as by a screw 69. The upper portion of stem 63 is rectilinearly guided in the tubular portion 70 of a spider which is removably engaged and centered in the upper portion of the valve body 64. Tube 54 is led into the valve body cavity between valve members 67 and 68. The bottom of the valve body is closed by a threaded plug 71 pierced to receive the end of a tube 72 leading from a suitable source of fluid under pressure. A compression spring 73 interposed between plug 71 and valve member 68 normally urges valve stem 63 upwardly and if the recess 62 is in register with the extremity of the valve stem valve member 68 will be seated and valve member 67 unseated.

If, now, lever 60 is swung in a clockwise direction toward the position of Figure 1, the inclined wall of recess 62 will cam the valve stem downwardly and valve member 67 will be seated and valve member 68 unseated. The pressure fluid is thus given access to tube 54 and to left hand end of cylinder 45 so that piston 47 and rod 42 will move to the right hand position shown. The wedge portion 43 has thus been caused to coact with the inner edges 44 of the arbor segments and the latter have been forced apart and held in their outer limit positions wherein the fitting may be threaded thereon as hereinbefore described, equalized action of the wedge portion being assured due to its loose pivotal connection with rod 42. When lever 60 is swung back to a position determined by the abrupt wall of recess 62 engaging the extremity of stem 63, valve member 68 will be seated by spring 73 and valve member 67 unseated. The supply of fluid under pressure is thus cut off from cylinder 45 and the piston is moved to the left under the influence of spring 48, thus withdrawing wedge portion 43 and permitting the arbor to be collapsed as the result of the action of springs 36. Movement of the piston 47 under the action of spring 48 is entirely free, since tube 54 is in communication past the valve member 67 and the spider, which supports guide 63, with the atmosphere. It will be understood that the position of the arbor segments, Figure 1, obtains only when stem 63 rides on the circular portion of rib 61.

A ring 74 mounted on the reduced portion 20 of spindle 15 has an internal central annular recess 75 and outwardly disposed annular recesses in which are disposed packing rings 76 and 77 which form a tight fit with the periphery of portion 20. Ring 74 is held against rotation by means of a screw 78 threaded into the upper end of pedestal 11 and engaged in a peripheral notch 79 in ring 74. Axial displacement of ring 74 is prevented by the shoulder on the spindle at the right of the reduced portion 20 and by the neck 46 of cylinder 45.

Portion 20 has an aperture 80 formed therein in register with recess 75 and bushings 40 and 41 have one or more axially extending through openings 40' and 41'. Ring 74 has a radial bore running into recess 75 and into which is connected a pipe 81 leading from a source of cleaning and/or lubricating fluid.

In the operation of the apparatus, fluid is preferably continuously fed through tube 81 into recess 75 and thence through passage 80, bore 17 and passages 40' and 41' to the tool holder, the fluid passing through opening 28 and out between the arbor segments. A principal function of the described fluid supply is to keep the arbor segments clear of foreign matter, such as cuttings, which might otherwise accumulate and block the free movement of the segments. The fluid may also serve to keep the parts lubricated.

Escape of the fluid from recess 75 is prevented, as far as possible, by the packings 76 and 77, but any fluid escaping past packing 77 is kept from bushing 13 by the nut 22. The fluid is largely kept from cylinder 45 by the packing 50 and any which passes this packing may escape from the cylinder through vent 49. This vent also serves, it will be understood, to eliminate dash-pot effects in the cylinder.

The upright side wall portions 56 and 57, hereinbefore referred to as providing journals for the ends of shaft 58, support at their upper ends pairs of parallel walled, undercut guideways 82 and 83 directly above and parallel to shaft 58. The inner ends of the pairs of ways are connected by a downwardly projecting block 84 provided with a bore in which the intermediate portion of shaft 58 is journaled, the shaft having collars 85 and 86 fixed thereon at the ends of block 84 and cooperating with the latter to prevent axial displacement of shaft 58. The shaft has fixed thereon, adjacent the walls 56 and 57, respectively, cylinders 87 and 88 which have formed therein the parallel-walled cam grooves 89 and 90.

Reciprocable on the ways 82 is a slide 91 which has fixed therein a downwardly projecting stud 92 on whose extremity is rotatable a roller 93 which is positioned in groove 89. Slide 91 has on its top surface a groove which extends parallel to the axis of spindle 15 and is engaged by a rib 94 formed on the bottom of a tool holder block 95. The latter has end flanges as at 96 provided with apertures elongated in the longitudinal direction of rib 94 and receiving cap screws 97 which are threaded into slide 91. Block 95 is thus adjustable in the axial direction of the spindle 15.

Block 95 has formed therein a through opening 98 which is of rectangular cross-section and is perpendicular to the vertical plane of the axis of spindle 15. A tool 99 is disposed in opening 98 and has an upper cutting edge 100. The tool is firmly held in the block by the downwardly acting screws 101 and the laterally acting screws 102.

A slide 103, reciprocable on ways 83, carries a roller 104 which is disposed in cam groove 90. A tool holder block 105 is adjustable on slide 103 in the manner described with reference to block 95.

Block 105 has a through passage 106 which extends perpendicularly to the axis of spindle 15, the passage being inwardly upwardly enlarged at 107 to provide downwardly faced end abutment surfaces 108 and 109. A pair of yokes 110 and 111 positioned within block 105 have threaded shanks 112 and 113 passed upwardly through top openings in the block, the yokes receiving a tool 114 which has a lower cutting edge 115. Nuts threaded on the upper portions of shanks 112 and 113 serve to draw the end portions of tool 114 against abutment surfaces 108 and 109 while cap screws 116 may be provided for exerting lateral seating pressure on the tool.

With the lever 60 in its initial or rest position, the rollers 93 and 104 are in the remote ends of grooves 89 and 90, Figures 3 and 3a. After the workpiece has been applied to the arbor, continued blockwise movement of lever 60 rapidly advances the slides 91 and 103 toward the workpiece which, it will be understood, is in the plane of the tools 99 and 114. In the present instance, the workpiece has a circumferential rib 38a and a ball portion 38b which it is desired to machine, and, accordingly, edges 100 and 115 are provided with the required contour.

Tool 99 is a roughing tool and tool 114 a finishing tool and, consequently, the former is to be engaged with the workpiece prior to the latter. As roller 93 approaches the innermost point 89' of groove 89, the workpiece is engaged by tool 99 and the roughing operation is completed as point 89' is reached. Roller 93 now passes into the outwardly directed terminal portion 89" of groove 89 so that tool 100 is retracted and as this occurs, roller 104 approaches the innermost point 90' of groove 90 so that the workpiece is engaged by tool 114. The finishing operation is completed when roller 104 reaches point 90' and as the roller passes into the outwardly directed terminal portion 90" of groove 90, the finishing tool is retracted. The clockwise movement of lever 60 has now reached its limit and this limit may be determined by the abutment of roller 104 with the closed end of groove portion 90".

It will be understood that throughout the swing of lever 60, valve stem 63 has been riding on the circular portion of rib 61 so that the workpiece has been securely held by the arbor.

As lever 60 is now swung in a counter-clockwise direction, tool 114 first moves in toward the work and then withdraws as roller 104 travels to the outer end of groove 90. Tool 99 undergoes a similar movement and when lever 60 again comes to the position of Figure 1, the tools being then completely withdrawn, the arbor collapses so that the workpiece may be removed by the attendant. In Figure 1, it is assumed that lever 60 has just been returned to the illustrated position and the wedge rod is about to move to the left.

From the above description, it will be seen that the operating trains for the tool holders and the operating train for controlling the wedge rod 42 all terminate in the common control lever 60 so that the entire succession of mechanical operations is carried out as the result of manipulation of the one lever. Efficient and correct operation is thus assured.

It will be understood that various changes may be made in the form and arrangement of parts and that the disclosure herein is merely illustrative. A possible modification contemplated is the provision of continuous grooves as 89 and 90 so that shaft 58 may be rotated always in the same direction, a cycle being completed, for example, during each complete rotation of the shaft. The scope of the invention extends to this as well as to other modifications which may fall within the following claims.

I claim:

1. Apparatus of the class described comprising a hollow spindle, a work holder secured to one end of said spindle, said work holder including axially extending jaws which are radially movable outwardly to engage a hollow work piece, a rod within said spindle and slidably guided for movement axially of the spindle, a wedge-shaped head pivoted to said rod and adapted to spread said jaws when urged therebetween, means limiting the spread of the jaws, the pivotal connection between said rod and head assuring equalized action of the latter on said jaws, and means for reciprocating said rod.

2. In apparatus of the class described comprising a work holder including a body, a plurality of bell crank members pivoted to said body and swingable in radial planes, said bell crank members each comprising a portion extending generally axially and a portion extending generally radially with respect to said body, said axially extending portions being externally threaded and constituting a segmental arbor for engagement with an internally threaded work piece, means for limiting the extent of engagement of the work piece with the arbor, spring means tending to collapse said arbor, and means for wedging the arbor segments apart, means for limiting spreading of said segments apart comprising abutment portions on said body for cooperation with said radially extending portions of said bell crank members, said arbor being of the exact size to readily receive the work piece by rotation when the arbor segments are in their limit positions apart.

EDWARD W. BAKER.